United States Patent
Azadet et al.

(10) Patent No.: US 8,015,226 B2
(45) Date of Patent: Sep. 6, 2011

(54) METHODS AND APPARATUS FOR PERFORMING REDUCED COMPLEXITY DISCRETE FOURIER TRANSFORMS USING INTERPOLATION

(75) Inventors: Kameran Azadet, Morganville, NJ (US); Samer Hijazi, Bethlehem, PA (US); Sunitha Kopparthi, Whitehall, PA (US); Albert Molina, Madrid (ES); Ramon Sanchez, Madrid (ES)

(73) Assignee: Agere Systems Inc., Allentown, PA (US)

( * ) Notice: Subject to any disclaimer, the term of this patent is extended or adjusted under 35 U.S.C. 154(b) by 1019 days.

(21) Appl. No.: 11/859,437

(22) Filed: Sep. 21, 2007

(65) Prior Publication Data
US 2009/0083352 A1    Mar. 26, 2009

(51) Int. Cl.
*G06F 17/14* (2006.01)
(52) U.S. Cl. .................................................. 708/405
(58) Field of Classification Search .................. None
See application file for complete search history.

(56) References Cited

U.S. PATENT DOCUMENTS

| | | | | | |
|---|---|---|---|---|---|
| 5,253,192 | A | * | 10/1993 | Tufts | 708/403 |
| 2008/0243983 | A1 | * | 10/2008 | Xu | 708/405 |
| 2008/0294709 | A1 | * | 11/2008 | Sathe et al. | 708/405 |

* cited by examiner

*Primary Examiner* — David H Malzahn
(74) *Attorney, Agent, or Firm* — Ryan, Mason & Lewis, LLP

(57) ABSTRACT

Methods and apparatus are provided for performing reduced complexity discrete Fourier transforms using interpolation An input sequence of length N is transformed by extending the input sequence to an extended input sequence of length M, where M is greater than N (a power of two greater than N); performing a discrete Fourier Transform (DFT), such as a power-of-two DFT, on the extended input sequence to obtain an interpolated sequence; and applying a conversion matrix to the interpolated sequence to obtain a DFT output for the input sequence of length N. The input sequence of length N can be extended to an extended input sequence of length M, for example, by employing a zero padding technique, a cyclic extension technique, a windowing of a cyclic extended sequence technique or a resampling-based interpolation technique to extend the input sequence. The conversion matrix is substantially a sparse matrix.

20 Claims, 6 Drawing Sheets

FIG. 5

| M | CYCLIC EXTENSION (CE)/ZERO PADDING (ZP) | WINDOW (W)/NO WINDOW (NW) | TYPE OF WINDOW | NO. OF TAPS (T) | CLOCK CYCLE COUNT | ENGERY CAPTURED BY APPROXIMATION (%) | COMPUTATIONAL COMPLEXITY SAVINGS (%) | BITS | OUTPUT SNR | MEAN OF ERROR | MEAN OF INPUT DATA | VARIANCE OF INPUT DATA |
|---|---|---|---|---|---|---|---|---|---|---|---|---|
| 1024 | ZP | NW | NONE | 5 | 9463 | 90 | 97.95 | 2.53 | 15.16 | 0.062 | 0.012 | 2.004 |
| 1024 | ZP | NW | NONE | 7 | 11141 | 95 | 97.71 | 2.87 | 17.19 | 0.038 | 0.011 | 1.993 |
| 1024 | ZP | NW | NONE | 27 | 27921 | 99 | 95.32 | 3.94 | 23.64 | 0.009 | 0.010 | 2.012 |
| 1024 | ZP | NW | NONE | 239 | 205789 | 99.9 | 70.30 | 5.83 | 35 | 7.4e-4 | 0.007 | 1.980 |

FIG. 6

| M | CYCLIC EXTENSION (CE)/ZERO PADDING (ZP) | WINDOW (W)/NO WINDOW (NW) | TYPE OF WINDOW | NO. OF TAPS (T) | CLOCK CYCLE COUNT | ENGERY CAPTURED BY APPROXIMATION (%) | COMPUTATIONAL COMPLEXITY SAVINGS (%) | BITS | OUTPUT SNR | MEAN OF ERROR | MEAN OF INPUT DATA | VARIANCE OF INPUT DATA |
|---|---|---|---|---|---|---|---|---|---|---|---|---|
| 1024 | CE | NW | NONE | 3 | 7785 | 90 | 98.19 | 2.73 | 16.39 | 0.046 | 0.019 | 2.002 |
| 1024 | CE | NW | NONE | 3 | 7785 | 95 | 98.19 | 2.72 | 16.32 | 0.047 | 0.007 | 2.020 |
| 1024 | CE | NW | NONE | 23 | 24565 | 99 | 97.00 | 4.17 | 25.03 | 0.006 | 0.010 | 1.959 |
| 1024 | CE | NW | NONE | 201 | 173907 | 99.9 | 83.65 | 5.91 | 35.43 | 6.3e−4 | 0.010 | 2.010 |

FIG. 7

| M | CYCLIC EXTENSION (CE)/ZERO PADDING (ZP) | WINDOW (W)/NO WINDOW (NW) | TYPE OF WINDOW | NO. OF TAPS (T) | CLOCK CYCLE COUNT | ENERGY CAPTURED BY APPROXIMATION (%) | COMPUTATIONAL COMPLEXITY SAVINGS (%) | BITS | OUTPUT SNR | MEAN OF ERROR | MEAN OF INPUT DATA | VARIANCE OF INPUT DATA |
|---|---|---|---|---|---|---|---|---|---|---|---|---|
| 2048 | CE | W | HANN | 3 | 15990 | 90 | 96.15 | 3.9 | 23.39 | 0.009 | 0.008 | 2.010 |
| 2048 | CE | W | HANN | 3 | 15990 | 95 | 96.15 | 3.89 | 23.35 | 0.009 | 0.003 | 2.012 |
| 2048 | CE | W | HANN | 5 | 17668 | 99 | 95.91 | 4.52 | 27.09 | 0.004 | 0.017 | 1.967 |
| 2048 | CE | W | HANN | 7 | 19346 | 99.9 | 95.67 | 8.6 | 51.6 | 1.4e−5 | 0.014 | 2.028 |

FIG. 8

| M | CYCLIC EXTENSION (CE)/ZERO PADDING (ZP) | WINDOW (W)/NO WINDOW (NW) | TYPE OF WINDOW | NO. OF TAPS (T) | CLOCK CYCLE COUNT | BITS | OUTPUT SNR | MEAN OF ERROR | MEAN OF INPUT DATA | VARIANCE OF INPUT DATA |
|---|---|---|---|---|---|---|---|---|---|---|
| 2048 | CE | W | KAISER | 5 | 15620 | 3.41 | 20.49 | 15.78 | 0.027 | 2.106 |
| 2048 | CE | W | KAISER | 10 | 19815 | 9.03 | 54.19 | 6.1e-3 | 0.021 | 1.924 |
| 2048 | CE | W | KAISER | 15 | 24010 | 21.31 | 126.86 | 3.5e-10 | 0.004 | 2.018 |
| 2048 | CE | W | KAISER | 20 | 28205 | 23.05 | 138.32 | 2.6e-11 | 0.046 | 2.104 |

METHODS AND APPARATUS FOR PERFORMING REDUCED COMPLEXITY DISCRETE FOURIER TRANSFORMS USING INTERPOLATION

FIELD OF THE INVENTION

The present invention relates generally to Fourier transform techniques, and more particularly, to techniques for performing a discrete Fourier transform with reduced computational complexity

BACKGROUND OF THE INVENTION

The Fourier transform maps functions to other functions. Generally, the Fourier transform decomposes a function into a continuous spectrum of its frequency components. Likewise, the inverse Fourier transform synthesizes a function from its spectrum of frequency components. The discrete Fourier transform (DFT) is a transform for Fourier analysis of finite-domain discrete-time signals.

The DFT of a vector r of length N is defined as follows:

$$y_k = \frac{1}{\sqrt{N}} \sum_{n=0}^{N-1} e^{-\frac{2\pi i}{N}kn} r_n \text{ where } k = 0, \ldots, N-1.$$

See, for example, E. C. Ifeachor and B. W. Jervis, "Digital Signal Processing: A Practical Approach," Addison-Wesley, June 1993; or http://en.wikipedia.org/wiki/Discerete_fourier_transform. Evaluating these sums directly would take on the order of $N^2$ arithmetical operations. A fast Fourier transform (FFT) algorithm reduces the complexity to an order of N log N operations. In general, such algorithms depend upon the factorization of N, so for most values of N, the FFT complexity is on the order of N log N.

One popular FFT implementation is the Cooley-Tukey algorithm. Generally, the Cooley-Tukey algorithm recursively breaks down a DFT of any composite size N equal to N1·N2 into many smaller DFTs of sizes N1 and N2, along with order of N multiplications by complex toots of unity The most well-known use of the Cooley-Tukey algorithm divides the transform into two pieces of size N/2 at each step, and is therefore limited to power-of-two sizes. In general, however, any factorization can be used, such as radix-2 and mixed-radix algorithms.

While such existing FFT algorithms efficiently decompose a function of length N into a discrete spectrum of its frequency components for many values of N, brute force DFTs must still generally be used when N is a large prime number. A need therefore exists for improved methods and apparatus that approximate the DFT result for a large prime number.

SUMMARY OF THE INVENTION

Generally, methods and apparatus are provided for performing reduced complexity discrete Fourier transforms using interpolation. According to a first aspect of the invention, an input sequence of length N is transformed by extending the input sequence to an extended input sequence of length M, where M is greater than N (a power of two greater than N); performing a discrete Fourier Transform (DFT), such as a power-of-two DFT, on the extended input sequence to obtain an interpolated sequence; and applying a conversion matrix to the interpolated sequence to obtain a DFT output for the input sequence of length N.

The input sequence of length N can be extended to an extended input sequence of length M, for example, by employing a zero padding technique, a cyclic extension technique, a windowing of a cyclic extended sequence technique or a resampling-based interpolation technique to extend the input sequence According to another aspect of the invention, the conversion matrix is substantially a sparse matrix.

A more complete understanding of the present invention, as well as further features and advantages of the present invention, will be obtained by reference to the following detailed description and drawings.

BRIEF DESCRIPTION OF THE DRAWINGS

FIGS. 5 through 8 are tables illustrating the complexity analysis for the computation of exemplary 839 (N) point DFTs using the four exemplary sequence extension approaches.

DETAILED DESCRIPTION

Figure 1:
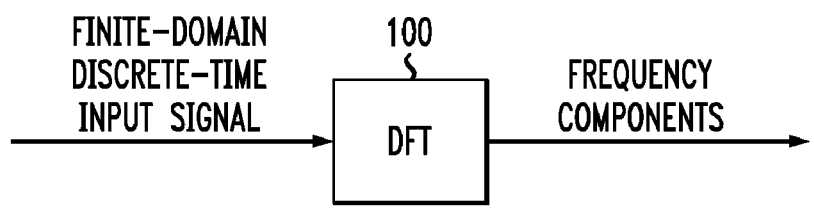
FIG. 1 illustrates the evaluation of a DFT on a finite-domain discrete-time input signal, to decompose the input function into a continuous spectrum of its frequency components.

The present invention provides methods and apparatus for performing reduced complexity discrete Fourier transforms using interpolation. FIG. 1 illustrates the evaluation of a DFT 100 on a finite-domain discrete-time input signal, to decompose the input function into a discrete spectrum of its frequency components. As previously indicated, the DFT 100 of a vector r of length N can be defined as follows:

$$y_k = \frac{1}{\sqrt{N}} \sum_{n=0}^{N-1} e^{-\frac{2\pi i}{N}kn} r_n \text{ where } k = 0, \ldots, N-1. \tag{1}$$

Equation 1 can also be written as follows:

$$y_{N \times 1} = F_{N \times N} r_{N \times 1}$$

where all the elements of matrix F are defined by $$e^{-\frac{2\pi i}{N}kn}$$

for k=0, ..., N−1 and n=0, ..., N−1.

Evaluating DFT based on equation (2) would take $O(N^2)$ arithmetic operations. However, by using a radix-2 algorithm, the DFT can be evaluated by $O(N \times \log_2 N)$ operations.

Simplification of DFT by Interpolation

Figure 2:
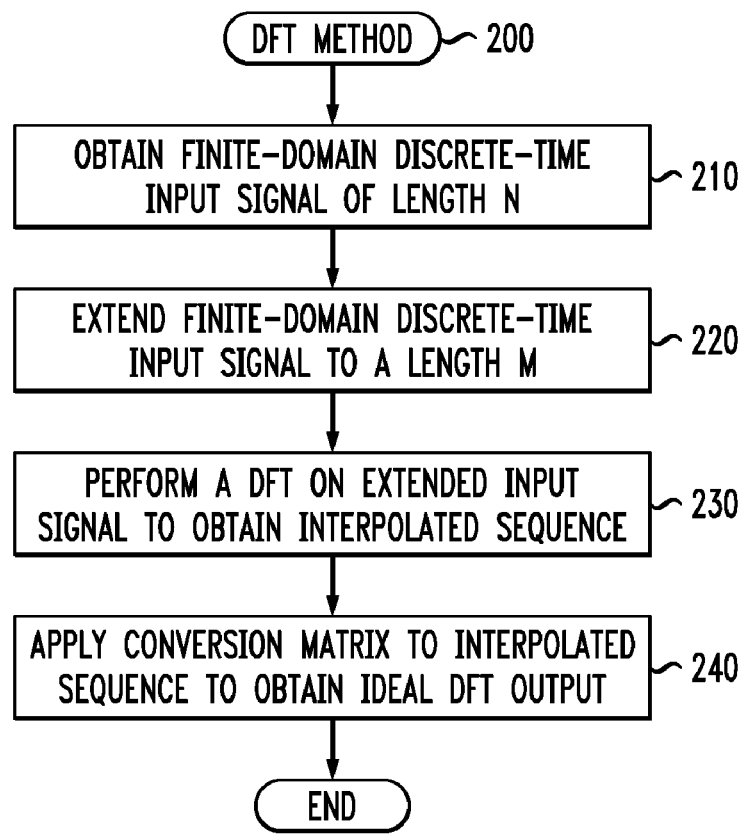
FIG. 2 is a flow chart describing an exemplary implementation of a DFT method 200 incorporating features of the present invention.

The present invention recognizes that a DFT can be obtained with reduced complexity using interpolation. FIG. 2 is a flow chart describing an exemplary implementation of a DFT method 200 incorporating features of the present invention. As shown in FIG. 2, the DFT method 200 initially obtains the finite-domain discrete-time input signal of length N, during step 210 The DFT method 200 then extends the finite-domain discrete-time input signal to a length M during step 220. In four exemplary embodiments discussed herein, the extension may be performed using a zero padding, cyclic extension, windowing of a cyclic extended sequence and resample based interpolation technique. For example, when N is not a power of two, the input signal can be extended to a length M, which is a power of two greater than N.

During step 230, the DFT method 200 performs a DFT, such as a power-of-two DFT, on the extended input signal to obtain interpolated sequence. Finally during step 240, a conversion matrix is applied to the interpolated sequence to obtain the ideal DFT output.

The DFT method 200 may also be expressed using the following pseudo-code:

Step 1: Extend non-power-of-two sequence (r) of length N to a power-of-two sequence of length M by performing zero padding or cyclic extension (r')

Step 2: Perform Radix-2 FFT operation on r'.

Step 3: Compute a conversion matrix (Q) and apply Q to obtain the DFT of r (i.e., x=Qr'=Fr where F is the DFT matrix).

Step 4: Obtain an approximation of x (x') using a simplified version of Q ($Q_t$). $Q_t$ has only T nonzero elements per row.

$$x' = Q_t r'$$

Zero Padding

As indicated above, the DFT method 200 extends the finite-domain discrete-time input signal of length N to a length M. In an exemplary zero padding embodiment, for values of N that ate not equal to a power of two, zeros are added to the end of the input sequence so that total length of the sequence is equal to a power of two. This leads to an interpolated DFT result in accordance with the present invention. Equation 2 can be written as follows, where M is a number equal to a power of two:

$$y_{M \times 1} = W_{M \times M} r_{M \times 1} \quad (3)$$

The same result can also be obtained using the following equation:

$$y_{M \times 1} = Z_{M \times M} U_{zM \times N} r_{N \times 1} \quad (4)$$

where all of the elements of matrix Z (an FFT of the input sequence) are defined by $$e^{-\frac{2\pi i}{M} km}$$

and k=0, . . . , M−1, m=0, . . . , M−1 and $$U_{zM \times N} = \begin{bmatrix} I_{N \times N} \\ 0_{M-N \times N} \end{bmatrix}$$

where I and 0 are the identity and null matrices. Thus, equations 3 and 4 provide the FFT of the extended input sequence.

The DFT of the original sequence (having a length N that is not a power of two), can be obtained from y (the FFT of the extended input sequence) utilizing a conversion matrix Q Conversion matrix, Q, is used to convert any power of two DFT sequence to a non power of two DFT sequence.

$$y_{N \times 1} = Q_{N \times M} y_{M \times 1} \quad (5)$$
$$= Q_{N \times M} Z_{M \times M} U_{zM \times N} r_{N \times 1}$$
$$= Q_{N \times M} W_{zM \times N} r_{N \times 1}$$

From Equations (2) and (5), $$F = QW_z \quad (6)$$

Alternatively, equation (6) can be expressed as follows:

$$Q = FW_z^{\dagger}$$

where $W_z^{\dagger}$ is the pseudo inverse of $W_z$ and is defined by $(W_z^H W_z)^{-1} W_z^H$ and $W_z^H$ is the complex conjugate of the transposed matrix of $W_z$. $W_z^H W_z$ is an identity matrix. Therefore, $W_z^{\dagger} = W_z^H$ and $Q = FW_z^H$ The elements in Q can be computed using the following equation:

$$q_{m,n} = \frac{1}{\sqrt{MN}} \sum_{l=0}^{N-1} e^{2j\pi l \left( \frac{m}{M} - \frac{n}{N} \right)} \quad (7)$$

where m=0, . . . , M−1 and n=0, . . . , N−1

The term $$\sum_{l=0}^{N-1} e^{2j\pi l \left( \frac{m}{M} - \frac{n}{N} \right)}$$

represents a geometric progression (GP) of N elements. The sum of p elements of a GP is defined as follows:

$$\sum_{p=0}^{P-1} af^p = a \frac{1 - f^P}{1 - f} \quad (8)$$

Hence, the elements of matrix Q can be defined as shown in the following equation:

$$q_{(m,n)} = \frac{1}{\sqrt{MN}} \frac{1 - e^{jAN}}{1 - e^{jA}} \quad (9)$$

where $$A = 2\pi \left( \frac{m}{M} - \frac{n}{N} \right),$$

m=0, . . . , M−1 and n=0, . . . , N−1 except fox q(1,1) which is equal to N. The magnitude of q is defined as $$|q| = \sqrt{\frac{1 - \cos(NA)}{1 - \cos(A)}}.$$

Figure 3:
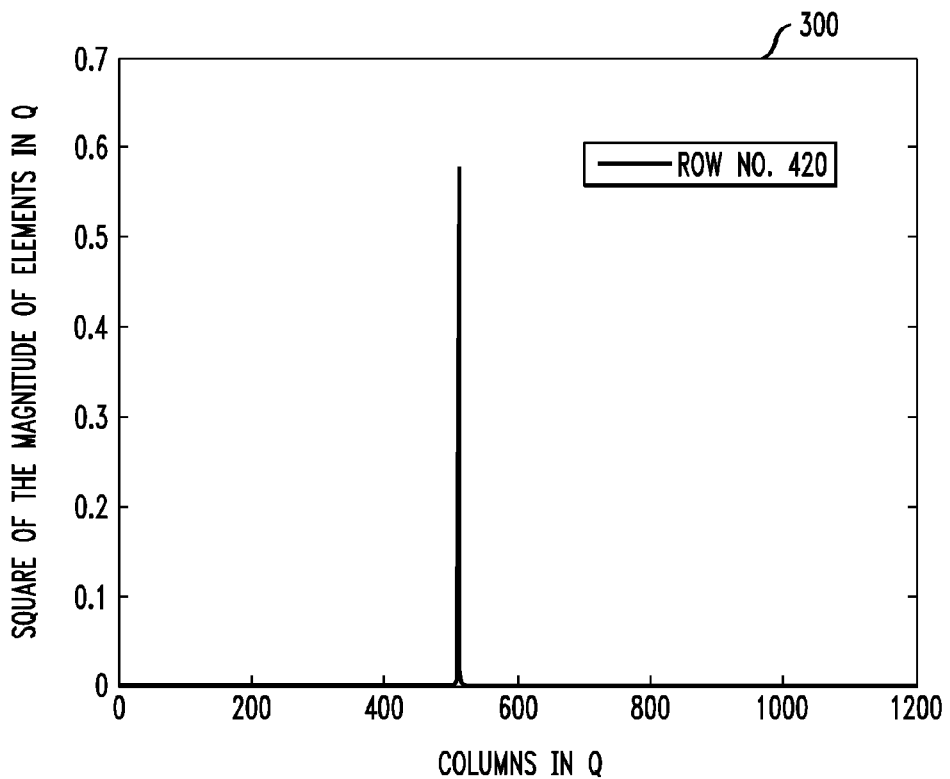
FIG. 3 illustrates the square of the magnitude of the elements in an exemplary row of a conversion matrix Q.
Figure 4:
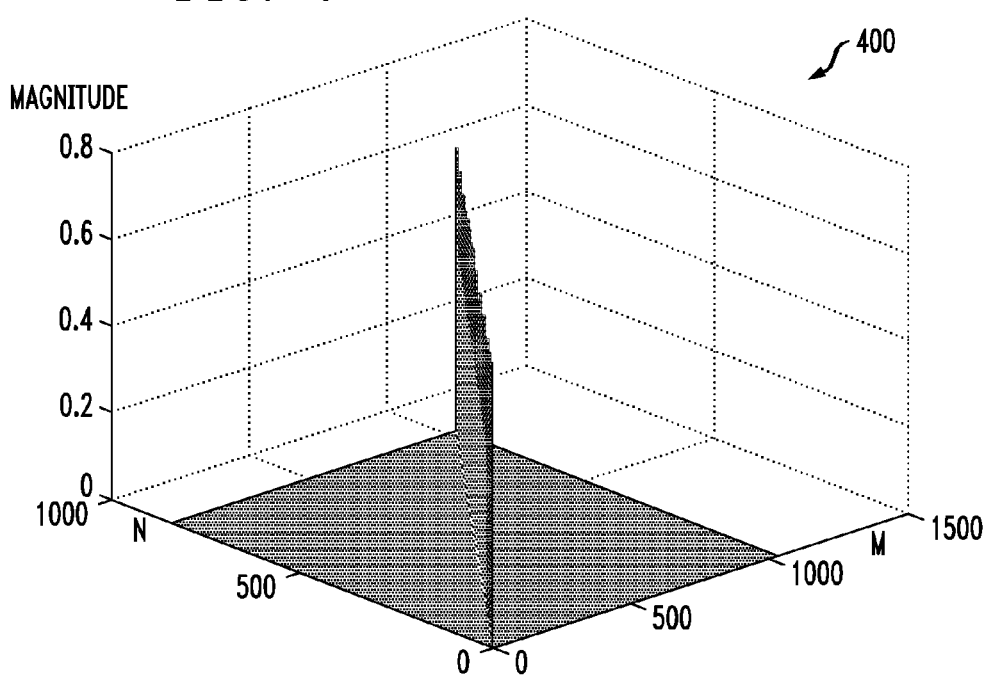
FIG. 4 illustrates the square of the magnitude of all the elements in the conversion matrix Q.

FIG. 3 is a plot 300 illustrating the square of the magnitude of the elements in the exemplary 420th row of the conversion matrix Q. It is noted that the pattern observed in the magnitude square of Q elements for all the rows is similar to the plot 300 shown in FIG. 3 FIG. 4 is a plot 400 illustrating the square of the magnitude of all the elements in the conversion matrix Q, for exemplary values of N equal to 839 and M equal to 1024. As shown in FIG. 4, the conversion matrix Q is essentially a sparse matrix having the magnitude primarily concentrated on the diagonal, with the other elements having near-zero values. Thus, there are relatively few elements in the matrix, resulting in a reasonable number of computations.

Cyclic Extension of the Sequence

As indicated above, the DFT method 200 extends the finite-domain discrete-time input signal of length N to a length M. In an exemplary cyclic extension embodiment, for values of N that are not equal to a power of two, a cyclic extension can be performed on the sequence to make its length equal to power of two. This operation can be performed, for example, by multiplying the input sequence with a matrix $U_c$, as follows:

$$U_{cM \times N} = \begin{bmatrix} I_{N \times N} \\ I_{M-N \times M-N} \quad 0_{M-N \times 2N-M} \end{bmatrix} \quad (10)$$

The interpolated sequence obtained by performing a power-of-two DFT on the cyclic extended sequence is given by the following equation:

$$y'_{cM \times 1} = Z_{cM \times M} U_{cM \times N} r_{N \times 1} = W_{cM \times N} r_{N \times 1} \quad (11)$$

$Z_c$ can be represented as $Z_{cM \times M} = [z_{c1} \ z_{c2} \ldots z_{cM}]$ where $z_{c1}$, $z_{c2}$, ... and $z_{cM}$ are vectors each of length M representing each column in Z. Then, $W_c$ can be expressed as follows:

$$W_{cM \times N} = Z_{cM \times M} U_{cM \times N} \quad (12)$$
$$= [z_{c1} + z_{cN+1} \ z_{c2} + z_{cN+2} \cdots z_{cM-N} + z_{cM} \ z_{cM-N+1} \cdots z_{cM}]$$

The DFT of the original input sequence can be obtained by multiplying $y_c'$ by the conversion matrix Q as follows:

$$y_{N \times 1} = Q_{cN \times M} y_{cM \times 1} \quad (13)$$
$$= Q_{cN \times M} W_{cM \times N} r_{N \times 1}$$

From equations (2) and (13), $$F = Q_c W_c.$$

Alternatively, $$Q_c = F W_c^\dagger.$$

where $W_c^\dagger$ is the pseudo inverse of $W_c$ and is defined by $(W_c^H W_c)^{-1} W_c^H$ and $W_c^H$ is the complex conjugate of the transposed matrix of $W_c$. $W_c^H W_c$ is a diagonal matrix where the first M−N elements along the diagonal are equal to ½ and the value of the remaining elements is 1. In addition:

$$(W_c^H W_c)^{-1} W_c^H = \left[ \frac{z_{c1} + z_{cN+1}}{2} \ \frac{z_{c2} + z_{cN+2}}{2} \cdots \frac{z_{cM-N} + z_{cM}}{2} \ z_{cM-N+1} z_{cN} \right]^H$$

The conversion matrix $Q_c$ for the cyclic extension embodiment may be expressed as follows:

$$Q_c = F(W_c^H W_c)^{-1} W_c^H \quad (14)$$
$$= F \left[ \frac{z_{c1} + z_{cN+1}}{2} \ \frac{z_{c2} + z_{cN+2}}{2} \cdots \frac{z_{cM-N} + z_{cM}}{2} \ z_{cM-N+1} z_{cN} \right]^H$$

The elements of the conversion matrix Q is given by the following equation:

$$\Rightarrow q_{cm,n} = \quad (15)$$
$$\left\{ \frac{1}{\sqrt{MN}} \sum_{l=0}^{M-N-1} \frac{e^{2j\pi l(\frac{m}{M} - \frac{n}{N})} + e^{2j\pi(\frac{(l+N)m}{M} - \frac{nl}{N})}}{2} + \sum_{l=M-N}^{N-1} e^{2j\pi l(\frac{m}{M} - \frac{n}{N})} \right\}$$

wherein m=0, ..., M−1 and n=0, ..., N−1.

Equation (15) can be split into three parts, each of which is a Geometric Progression (GP) as follows:

$$q_{cm,n} = \frac{1}{\sqrt{MN}} \quad (16)$$
$$\left[ \frac{1}{2} \times \frac{1 - e^{jA(M-N)}}{1 - e^{jA}} + \frac{1}{2} \times \frac{1 - e^{j(A + \frac{Nm}{M})(M-N)}}{1 - e^{j(A + \frac{Nm}{M})}} + \frac{e^{jA(M-N)} - e^{jAN}}{1 - e^{jA}} \right]$$

Windowing of a Cyclic Extended Sequence

As indicated above, the DFT method 200 extends the finite-domain discrete-time input signal of length N to a length M. In an exemplary windowing of a cyclic extended sequence, for values of N that are not equal to a power of two, a cyclic extension can be performed on the sequence to make its length equal to power of two and more. A windowing operation can be performed on the cyclic extended sequence to obtain the sequence of required length. Here, for example, for an 839 point DFT, the length of the cyclic extension is chosen to be 2048. This operation can be performed by multiplying the sequence with a matrix $U_w$, defined as follows:

$$U_{wM \times N} = \begin{bmatrix} I_{N \times N} \\ I_{N \times N} \\ I_{M-N \times M-N} \quad 0_{M-N \times 2N-M} \end{bmatrix} \quad (17)$$

The interpolated sequence obtained by performing power-of-two DFT on the windowed cyclic extended sequence is given as follows:

$$y'_{wM \times 1} = Z_{wM \times M} D_{M \times M} U_{wM \times N} r_{N \times 1} \quad (18)$$

where $U_w$ is the matrix to define the cyclic extension of the sequence given by Equation (19) and D (shown below in Equation (20)) is the matrix used to apply a windowing operation on the cyclic extended input sequence:

$$U_{wM \times N} = \begin{bmatrix} I_{N \times N} \\ I_{N \times N} \\ I_{M-N \times M-N} \quad 0_{M-2N \times 3N-M} \end{bmatrix} \quad (19)$$

-continued $$D_{M \times M} = \begin{bmatrix} d_1 & & & & \\ & d_2 & & 0 & \\ & & \ddots & & \\ & 0 & & d_{M-1} & \\ & & & & d_M \end{bmatrix} \quad (20)$$

The DFT of the original sequence can be obtained by multiplying $y_w'$ by the conversion matrix $Q_w$ as follows:

$$y_{wN \times 1} = Q_{wN \times M} y'_{wM \times 1} \quad (21)$$
$$= Q_{wN \times M} Z_{wM \times M} D_{wM \times M} U_{wM \times N} r_{N \times 1}$$

From equations (2) and (21), $$F = Q_w Z_w D_w U_w.$$

Alternatively:

$$Q_w = F(Z_w D_w U_w)^\dagger$$

where $(Z_w D_w U_w)^\dagger$ is the pseudo inverse of $(Z_w D_w U_w)$ and is defined by $((Z_w D_w U_w)^H (Z_w D_w U_w))^{-1} (Z_w D_w U_w)^H$.

$$Q_w = F(Z_w D_w U_w)^\dagger \quad (22)$$
$$= F(U_w^H D_w^H Z_w^H Z_w D_w U_w)^{-1} U_w^H D_w^H Z_w^H$$
$$= F(U_w^H D_w^2 U_w)^{-1} U_w^H D_w^H Z_w^H$$

where $(U_w^H D_w^2 U_w)^{-1}$ is defined as follow:

$$(U_w^H D_w^2 U_w)^{-1} = \left( \begin{bmatrix} D_1^2 & 0 & 0 & 0 & 0 \\ 0 & D_2^2 & 0 & 0 & 0 \\ 0 & 0 & D_3^2 & 0 & 0 \\ 0 & 0 & 0 & D_4^2 & 0 \\ 0 & 0 & 0 & 0 & D_5^2 \end{bmatrix} \begin{bmatrix} I_4 & 0_5 \\ 0_4 & I_5 \\ I_4 & 0_5 \\ 0_4 & I_5 \\ I_6 & 0_6 \end{bmatrix} \right)^{-1} \quad (23)$$

$$= \begin{bmatrix} (D_1^2 + D_3^2 + D_5^2)^{-1} & 0 \\ 0 & (D_2^2 + D_4^2)^{-1} \end{bmatrix}$$

where $I_1$, $I_2$, $I_3$, $I_4$, $I_5$, & $I_6$ are identity matrices of sizes M−2N×N/2, 3N−M×N/2, M−2N×M−2N, N/2×M−2N, N/2×2N & 2N×2N, $0_1$, $0_2$, $0_3$, $0_4$, $0_5$, & $0_6$ are null matrices of sizes M−2N×N/2, 3N−M×N/2, 3N−M×M−2N, N/2×M−2N, N/2×2N & 2N×2N, $D_1^2$, $D_2^2$, $D_3^2$, $D_4^2$ are the diagonal matrices of D of sizes N/2×N/2 and $D_5^2$, M−2N×M−2N, respectively.

The conversion matrix $Q_c$ may be expressed as follows:

$$Q = \quad (24)$$
$$F \begin{bmatrix} (D_1^2 + D_3^2 + D_5^2)^{-1} & 0 \\ 0 & (D_2^2 + D_4^2)^{-1} \end{bmatrix} \begin{bmatrix} D_1^2 & 0 & D_3^2 & 0 & D_5^2 \\ 0 & D_2^2 & 0 & D_4^2 & 0 \end{bmatrix} Z^H$$

Resample Based Interpolation

As indicated above, the DFT method 200 extends the finite-domain discrete-time input signal of length N to a length M. In an exemplary resample based interpolation, for any non power of 2 sequence (r) of length N, a cyclic extension can be performed on the sequence to make its length equal to power of 2 (M) and mote. The transformed sequence (y') is obtained by performing FFT on r. To obtain an approximation of y. Resample is performed on y' with special attention paid to eliminate the edge effect. Resample is the combination of interpolation and decimation to change the sampling rate by a rational factor. The resample function samples the input sequence at N/M times the original sample rate using a polyphase implementation. During a resampling process, anti-aliasing (low pass) FIR filter via Kaiser window is used to compensate for the filter delay. The filter length can be changed and with increase in the filter length the accuracy increases at the expense of additional computation complexity. This operation is performed offline and only the filter taps (twice the filter length) need to be stored and can be used for on chip computations.

The resampling operation can be expressed in matrix form as follows $$y_{rN \times 1} = D_{N \times MN} H_{MN \times MN} U_{MN \times M} y_{M \times 1}$$

where $U_{MN \times M}$ is the upsample-by-N matrix, $H_{MN \times MN}$ is the interpolation lowpass filter and $D_{N \times MN}$ is the downsample-by-M matrix:

$$\begin{bmatrix} y_{r_0} \\ \vdots \\ y_{r_{N-1}} \end{bmatrix} = \begin{bmatrix} 1 & 0_{1 \times (MN-1)} & & & \\ & \vdots & & & \\ 0_{1 \times (kM)} & 1 & 0_{1 \times (MN-kM-1)} & & \\ & \vdots & & & \\ 0_{1 \times ((N-1)M)} & 1 & 0_{1 \times (M-1)} & & \end{bmatrix} \begin{bmatrix} h_0 & h_{-1} & h_{-2} & \cdots & h_1 \\ h_1 & h_0 & h_{-1} & \cdots & h_2 \\ h_2 & h_1 & h_0 & \cdots & h_3 \\ \vdots & \vdots & \vdots & \vdots & \vdots \\ h_{MN-1} & h_{MN-2} & h_{MN-3} & \cdots & h_0 \end{bmatrix}$$

$$\begin{bmatrix} 1 & 0 & \cdots & 0 & 0 \\ 0_{(N-1) \times M} & & & & \\ 0 & 1 & \cdots & 0 & 0 \\ 0_{(N-1) \times M} & & & & \\ & & \vdots & & \\ 0 & 0 & \cdots & 0 & 1 \\ 0_{(N-1) \times M} & & & & \end{bmatrix} \begin{bmatrix} y'_0 \\ \vdots \\ y_{M-1} \end{bmatrix}$$

where index k=0 ... N−1 is the row index for matrix $D_{N \times MN}$. The elements of $H_{MN \times MN}$ are defined as $h_n = h_{n+NM}$ and $h_n = 0$, for $LN \le |n| \le MN/2$ Therefore, it can be observed that most of the entries in H matrix are zeros.

$$\begin{bmatrix} y_{r_0} \\ \vdots \\ y_{r_{N-1}} \end{bmatrix} =$$

$$\begin{bmatrix} h_0 & h_{-N} & h_{2N} & \cdots & h_{-(M-1)N} \\ h_M & h_{M-N} & h_{M-2N} & \cdots & h_{M-(M-1)N} \\ h_{2M} & h_{2M-N} & h_{2M-2N} & \cdots & h_{2M-(M-1)N} \\ \vdots & \vdots & \vdots & \vdots & \vdots \\ h_{(N-1)M} & h_{(N-1)M-N} & h_{(N-1)M-2N} & \cdots & h_{(N-1)M-(M-1)N} \end{bmatrix} \begin{bmatrix} y_0 \\ \vdots \\ y_{M-1} \end{bmatrix}$$

Approximation of Conversion Matrix Q

In a further variation of the present invention, rather than considering all of the elements in each row of conversion matrix Q, it is sufficient to use some elements (taps) around the point at which the magnitude of Q is maximum. Therefore, the conversion matrix can be approximated to Q' of size N×T. These elements contribute maximum energy when compared to other elements in that row. The magnitude of Q attains its maximum value when A approaches zero. This happens at $m_{max}$ equal to M×n/N. The sum of all the elements in each row of Q is one, i.e., $$\left| \sum_{m=0}^{M} Q(n, m) \right| = 1$$

By considering only T elements in each row of Q, some part of the energy is lost. The amount of energy captured by selecting a few elements in each row can as be expressed as follows, $$E_C(n) = \frac{\sum_{m=m_{max}-v}^{m_{max}+v} |Q(n, m)|^2}{\sum_{m=0}^{M} |Q(n, m)|^2} \quad (25)$$

where v=(T−1)/2, T is number of taps and $m_{max}$ is the column location of each row at which the square of the magnitude of Q is maximum. For a given M and N, only the required elements in Q (T elements in each row) can be computed offline and stored in a look up table, which can be used for on chip computations The number of MAC operations required for the computation of an N-point DFT for cyclic and zero padded input sequences is M×log$_2$M+T×N and for windowing cyclic extended input sequences, the number of required MAC operations is M×log$_2$M+T×N+M. For small values of T, this number is considerably less than the $N^2$ operations required for a brute force implementation of N-point DFT The complexity analysis for the computation of the exemplary 839 (N) point DFTs using the four exemplary sequence extension approaches are shown in FIGS. 5 through 8. It is noted that the savings in computational complexity is with respect to a classical DFT computation. The output SNR is the ratio of the mean of the signal power divided by the mean of the noise power. The error is the error energy of the difference between the actual and approximated DFT signals. The variable 'bits' in the tables of FIGS. 5-8 represent the accuracy of the approximated signal in comparison to the actual DFT signal and is defined as SNR(dB)/6. The mean and variance of the input data are also shown in FIGS. 5-8.

From FIGS. 5-8, it can be observed that resample based interpolation gives the best performance among the four exemplary embodiments. For example, when the number of taps is 15, more than 20 bit accuracy is obtained. This accuracy is obtained with more than 96% savings in the computational complexity compared to a direct 839-point DFT operation.

While exemplary embodiments of the present invention have been described with respect to digital logic blocks or software algorithms (or a combination thereof), as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit Thus, the functions of the present invention can be embodied in the form of methods and apparatuses for practicing those methods. One or more aspects of the present invention can be embodied in the for of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for transforming an input sequence of length N, comprising:
    extending said input sequence to an extended input sequence of length M, where M is greater than N;
    performing a discrete Fourier Transform (DFT) on said extended input sequence to obtain an interpolated sequence; and
    applying a conversion matrix to said interpolated sequence to obtain a DFT output for said input sequence of length N, wherein one or more of said extending, performing and applying steps are performed by a hardware device.

2. The method of claim 1, wherein M is a power of two greater than N.

3. The method of claim 1, wherein said extending step further comprises the step of employing a zero padding technique to extend said input sequence.

4. The method of claim 1, wherein said extending step further comprises the step of employing a cyclic extension technique to extend said input sequence.

5. The method of claim 1, wherein said extending step further comprises the step of employing a windowing of a cyclic extended sequence technique to extend said input sequence.

6. The method of claim 1, wherein said extending step further comprises the step of employing a resample-based interpolation technique to extend said input sequence.

7. The method of claim 1, wherein said conversion matrix is substantially a sparse matrix.

8. A system for transforming an input sequence of length N, comprising:
a memory; and
at least one processor, coupled to the memory, operative to:
extend said input sequence to an extended input sequence of length M, where M is greater than N;
perform a discrete Fourier Transform (DFT) on said extended input sequence to obtain an interpolated sequence; and
apply a conversion matrix to said interpolated sequence to obtain a DFT output for said input sequence of length N.

9. The system of claim 8, wherein M is a power of two greater than N.

10. The system of claim 8, wherein said input sequence is extended by employing a zero padding technique to extend said input sequence.

11. The system of claim 8, wherein said input sequence is extended by employing a cyclic extension technique to extend said input sequence.

12. The system of claim 8, wherein said input sequence is extended by employing a windowing of a cyclic extended sequence technique to extend said input sequence.

13. The system of claim 8, wherein said conversion matrix is substantially a sparse matrix.

14. A circuit for transforming an input sequence of length N, comprising:
a first logic block for extending said input sequence to an extended input sequence of length M, where M is greater than N;
a second logic block for performing a discrete Fourier Transform (DFT) on said extended input sequence to obtain an interpolated sequence; and
a third logic block for applying a conversion matrix to said interpolated sequence to obtain a DFT output for said input sequence of length N.

15. The circuit of claim 14, wherein M is a power of two greater than N.

16. The circuit of claim 14, wherein said input sequence is extended by employing a zero padding technique to extend said input sequence.

17. The circuit of claim 14, wherein said input sequence is extended by employing a cyclic extension technique to extend said input sequence.

18. The circuit of claim 14, wherein said input sequence is extended by employing a windowing of a cyclic extended sequence technique to extend said input sequence.

19. The circuit of claim 14, wherein said conversion matrix is substantially a sparse matrix.

20. An article of manufacture for transforming an input sequence of length N, comprising a machine readable medium containing one or more programs which when executed implement the steps of:
extending said input sequence to an extended input sequence of length M, where M is greater than N;
performing a discrete Fourier Transform (DFT) on said extended input sequence to obtain an interpolated sequence; and
applying a conversion matrix to said interpolated sequence to obtain a DFT output for said input sequence of length N.

* * * * *